United States Patent
Yang et al.

(10) Patent No.: US 9,621,819 B2
(45) Date of Patent: Apr. 11, 2017

(54) ELECTRONIC DEVICE AND MULTIMEDIA CONTROL METHOD THEREOF

(71) Applicant: Chunghwa Picture Tubes, LTD., Taoyuan (TW)

(72) Inventors: Hsu Yang, Keelung (TW); Hsiang-Tan Lin, Keelung (TW); Chun-Lun Pan, Tainan (TW); Chien-Hung Chen, New Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 14/795,711

(22) Filed: Jul. 9, 2015

(65) Prior Publication Data

US 2017/0013205 A1    Jan. 12, 2017

(51) Int. Cl.
*H04N 5/228* (2006.01)
*H04N 5/262* (2006.01)

(52) U.S. Cl.
CPC ................................. *H04N 5/2621* (2013.01)

(58) Field of Classification Search
CPC .. H04N 5/262; H04N 5/2621; H04N 5/23251; H04N 5/23254; H04N 5/23258; H04N 5/23264
USPC ................................ 348/208.99, 208.1–208.8
See application file for complete search history.

(56) References Cited

U.S. PATENT DOCUMENTS

| 9,342,873 B1* | 5/2016 | Barron .................. G06T 7/2013 |
| 2009/0160970 A1* | 6/2009 | Fredlund ................ H04N 5/232 |
| | | 348/229.1 |
| 2012/0327254 A1* | 12/2012 | Iwahashi ............... G06T 7/2013 |
| | | 348/208.4 |

FOREIGN PATENT DOCUMENTS

| CN | 101912689 | 12/2010 |
| CN | 203606621 | 5/2014 |
| TW | I347774 | 8/2011 |
| TW | 201143715 | 12/2011 |

\* cited by examiner

*Primary Examiner* — Yogesh Aggarwal
(74) *Attorney, Agent, or Firm* — J.C. Patents

(57) ABSTRACT

An electronic device and a multimedia control method thereof are provided. The electronic device has an image capturing unit and a detecting unit. The method includes following steps. When executing an image capturing operation for obtaining an image signal by the image capturing unit, a motion information of the electronic device and an environment information is simultaneously detected by the detecting unit. At least one effect control signal is generated according to the motion information and the environment information. The at least one effect control signal is outputted to at least one corresponding effect output device according to a timing of the image signal.

20 Claims, 2 Drawing Sheets

ELECTRONIC DEVICE AND MULTIMEDIA CONTROL METHOD THEREOF

BACKGROUND OF THE INVENTION

1. Field of the Invention

The present invention generally relates to the field of multimedia electronic information technology, in particular, to an electronic device and a multimedia control method thereof which associate with editing physical effects of five-dimensional (5D) multimedia data.

2. Description of Related Art

With the continuous development of science and technology advances, five-dimensional (5D) film has been developed as a new form of entertainment in order to make the audience feel more realistic. The 5D film incorporates physical effects along with a three-dimensional (3D) film, where the physical effects may include physical motion (e.g. seat motion effects including vibrating, air jets, etc.) and sensory experiences (e.g. smoke effects, water droplets, etc.).

To produce the 5D film, particularly shot from a first-person perspective, the current technology may install the physical effects into the 5D film by post-production. Specifically, after the end of completely shooting and recording the 3D film, certain time points for outputting the physical effects may be manually record, and then devices may be edited to be switched on for providing the physical motion (e.g. motion chairs) or for providing the sensory experiences (e.g. sprinklers, fans, etc.) based on the manually record time points. However, it may consume considerable time and human resources to manually record the time points for the physical effects. Besides, the post-produced physical effects may differ from the original environmental status during the shooting of the film, which may be incapable to provide real feelings for the audience.

SUMMARY OF THE INVENTION

Accordingly, the present invention is directed to an electronic device and a multimedia control method thereof, which may effectively reduce the required time and the human resource to editing the physical effects of the multimedia data, and may provide immersive experiences for the audience.

The invention provides a multimedia control method, which is adapted to an electronic device having an image capturing unit and a detecting unit. The method includes following steps. When executing an image capturing operation for obtaining an image signal by the image capturing unit, a motion information of the electronic device and an environment information is simultaneously detected by the detecting unit. At least one effect control signal is generated according to the motion information and the environment information. The at least one effect control signal is outputted to at least one corresponding effect output device according to a timing of the image signal.

In an embodiment of the invention, the motion information includes an acceleration data, a velocity data, a displacement data, an angle data, an angular velocity data and a magnetic data, the environment information includes a wind speed data and a wind direction data, and the step of generating the effect control signal according to the motion information and the environment information includes calculating an intensity of the effect control signal according to a weight ratio among part or all of the acceleration data, the velocity data, the displacement data, the angle data, the angular velocity data, the magnetic data, the wind speed data and the wind direction data.

In an embodiment of the invention, the effect control signal includes a wind direction feeling information, and the step of generating the effect control signal includes calculating an intensity of the wind direction feeling information according to the wind direction data, the magnetic data and the weight ratio between the wind direction data and the magnetic data.

In an embodiment of the invention, the effect control signal includes a wind speed feeling information, and the step of generating the effect control signal includes calculating an intensity of the wind speed feeling information according to the velocity data, the acceleration data, the wind speed data and the weight ratio among the velocity data, the acceleration data and the wind speed data.

In an embodiment of the invention, the effect control signal includes a moving direction feeling information, and the step of generating the effect control signal includes calculating an intensity of the moving direction feeling information according to the magnetic data, the angle data and the weight ratio between the magnetic data and the angle data.

In an embodiment of the invention, the effect control signal includes a vibration feeling information, and the step of generating the effect control signal includes calculating an intensity of the vibration feeling information according to the angular velocity data, the displacement data and the weight ratio between the angular velocity data and the displacement data.

In an embodiment of the invention, the environment information further includes an atmospheric pressure data, and the step of calculating the intensity of the vibration feeling information includes adjusting the intensity of the vibration feeling information according to the atmospheric pressure data.

In an embodiment of the invention, the environment information includes a lightness data and a color data, the effect control signal includes an ambient light feeling information, and the step of generating the effect control signal according to the motion information and the environment information includes setting an intensity of the ambient light feeling information according to the lightness data and the color data.

In an embodiment of the invention, the environment information includes a temperature data and a humidity data, the effect control signal includes a temperature feeling information, and the step of generating the effect control signal according to the motion information and the environment information includes determining whether the humidity data is greater than a humidity threshold, when the humidity data is greater than the humidity threshold, adjusting an intensity of the temperature feeling information according to determining whether the temperature data is greater than a temperature threshold, and when the humidity data is not greater than the humidity threshold, setting the intensity of the temperature feeling information according to the temperature data.

In an embodiment of the invention, a multimedia data including the image signal and the effect control signal is a four dimensional multimedia data or a five dimensional multimedia data.

The invention provides an electronic device. The electronic device includes an image capturing unit, a detecting unit and a processing unit. The image capturing unit executes an image capturing operation for obtaining an image signal. The detecting unit detects a motion information of the electronic device and an environment information. The processing unit is coupled to the image capturing unit and the detecting unit. When executing the image capturing operation for obtaining the image signal by the image capturing unit, the processing unit simultaneously detects a motion information of the electronic device and an environment information by the detecting unit, generates at least one effect control signal according to the motion information and the environment information, and outputs the at least one effect control signal to at least one corresponding effect output device according to a timing of the image signal.

In an embodiment of the invention, the motion information includes an acceleration data, a velocity data, a displacement data, an angle data, an angular velocity data and a magnetic data, the environment information includes a wind speed data and a wind direction data, and the processing unit calculates an intensity of the effect control signal according to a weight ratio among part or all of the acceleration data, the velocity data, the displacement data, the angle data, the angular velocity data, the magnetic data, the wind speed data and the wind direction data.

In an embodiment of the invention, the effect control signal includes a wind direction feeling information, and the processing unit calculates an intensity of the wind direction feeling information according to the wind direction data, the magnetic data and the weight ratio between the wind direction data and the magnetic data.

In an embodiment of the invention, the effect control signal includes a wind speed feeling information, and the processing unit calculates an intensity of the wind speed feeling information according to the velocity data, the acceleration data, the wind speed data and the weight ratio among the velocity data, the acceleration data and the wind speed data.

In an embodiment of the invention, the effect control signal includes a moving direction feeling information, and the processing unit calculates an intensity of the moving direction feeling information according to the magnetic data, the angle data and the weight ratio between the magnetic data and the angle data.

In an embodiment of the invention, the effect control signal includes a vibration feeling information, and the processing unit calculates an intensity of the vibration feeling information according to the angular velocity data, the displacement data and the weight ratio between the angular velocity data and the displacement data.

In an embodiment of the invention, the environment information further includes an atmospheric pressure data, and the processing unit adjusts the intensity of the vibration feeling information according to the atmospheric pressure data.

In an embodiment of the invention, the environment information includes a lightness data and a color data, the effect control signal includes an ambient light feeling information, and the processing unit sets an intensity of the ambient light feeling information according to the lightness data and the color data.

In an embodiment of the invention, the environment information includes a temperature data and a humidity data, the effect control signal includes a temperature feeling information, and the processing unit determines whether the humidity data is greater than a humidity threshold, when the humidity data is greater than the humidity threshold, the processing unit adjusts an intensity of the temperature feeling information according to determining whether the temperature data is greater than a temperature threshold, and when the humidity data is not greater than the humidity threshold, the processing unit sets the intensity of the temperature feeling information according to the temperature data.

In an embodiment of the invention, a multimedia data including the image signal and the effect control signal is a four dimensional multimedia data or a five dimensional multimedia data.

Based on the above, the electronic device and the multimedia control method thereof disclosed by the embodiments of the invention may obtain the image signal and simultaneously detect the motion information of the electronic device and the environment information, so as to generate the effect control signal to simulate the original environmental status precisely based on the detected motion information of the electronic device and the environment information. Besides, the required time and the human resource because of the post-production may also be effectively reduced.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
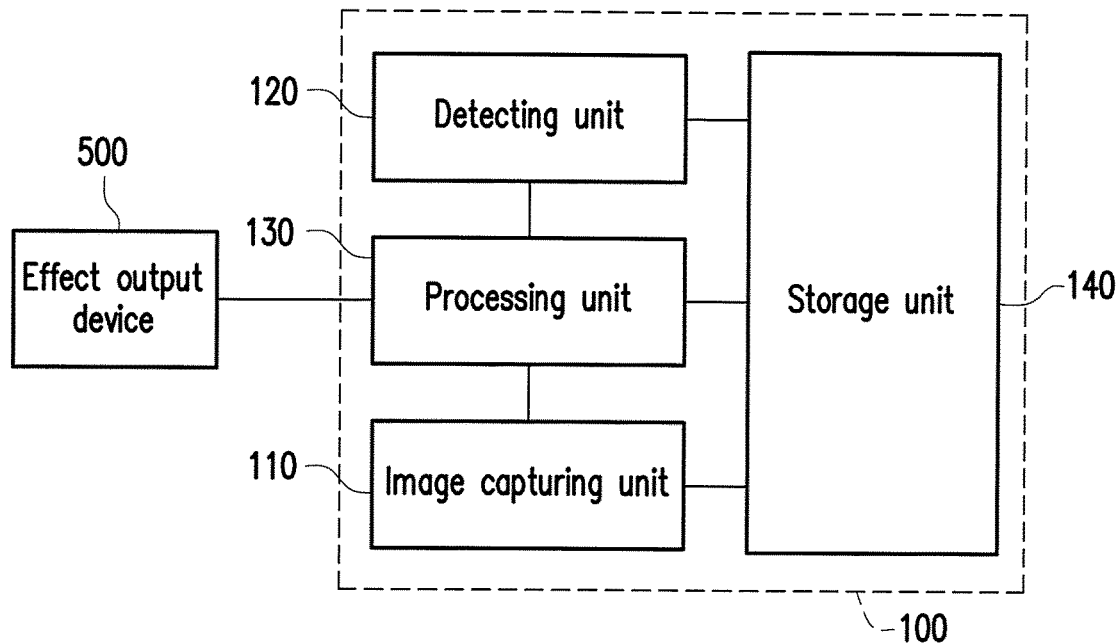
FIG. 1 is a block diagram illustrating an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the embodiments of the present invention, environment information and motion information of the electronic device may be simultaneously detected when the image capturing operation is executed, and at least one effect control signal may be generated according to the detected environment information and motion information. In other words, an original environmental status during the shooting of the film may be precisely converted into the effect control signal, and corresponding physical effects including physical motion and sensory experiences may be also edited during the video shooting. Therefore, the corresponding physical effects may be edited and completed as the end of the video shooting. In addition, costs of the time and human resources due to the post-production for installing the physical effects into the 5D film may be decreased.

FIG. 1 is a block diagram illustrating an electronic device according to an embodiment of the invention. Referring to FIG. 1, the electronic device 100 includes an image capturing unit 110, a detecting unit 120, a processing unit 130 and a storage unit 140, where the functionalities thereof are given as follows.

The image capturing unit 110, for example, may include fixed focus optical lens or optical zoom lens, and a photosensitive element, such as a charge coupled device (CCD) or complementary metal-oxide semiconductor (CMOS). In the present embodiment, the image capturing unit 110 may be configured to execute an image capturing operation to obtain an image signal, where the image signal may be used to form a 3D video.

The detecting unit 120 may include, for example, a G-sensor, an accelerometer, a gyroscope, a magnetometer, etc., or a combination thereof, though the invention is not limited thereto. In the present embodiment, the detecting unit 120 may be used for detecting a motion information including an acceleration data, an angular velocity data and a magnetic data, etc. of the electronic device 100 in 3D space. In addition, the detecting unit 120 may also calculate the detected data to derive, for example, a velocity data, a displacement data and a an angle data, etc. Moreover, the detecting unit 120 may also include an anemoscope, a temperature sensor, a humidity sensor, light sensor, color sensor and barometer, etc., which may be used for detecting an environment information including a wind speed data, a wind direction data, a temperature data, a humidity data, a light data, a color data and an atmospheric pressure data etc.

The processing unit 130 may be, for example, a single chip, a general-purpose processor, a special-purpose processor, a traditional processor, a digital signal processor (DSP), a plurality of microprocessors, or one or more microprocessors, controllers, microcontrollers, application specific integrated circuit (ASIC), or field programmable gate arrays (FPGA) with a DSP core. In the present embodiment, the processing unit 130 is configured to implement the proposed multimedia control method.

Moreover, the storage unit 140 is configured to store data (e.g. the detected motion information and the environment information) and accessible by the processing unit 130. The storage unit 140 may be, for example, a hard disk drive (HDD), a volatile memory, or a non-volatile memory.

Figure 2:
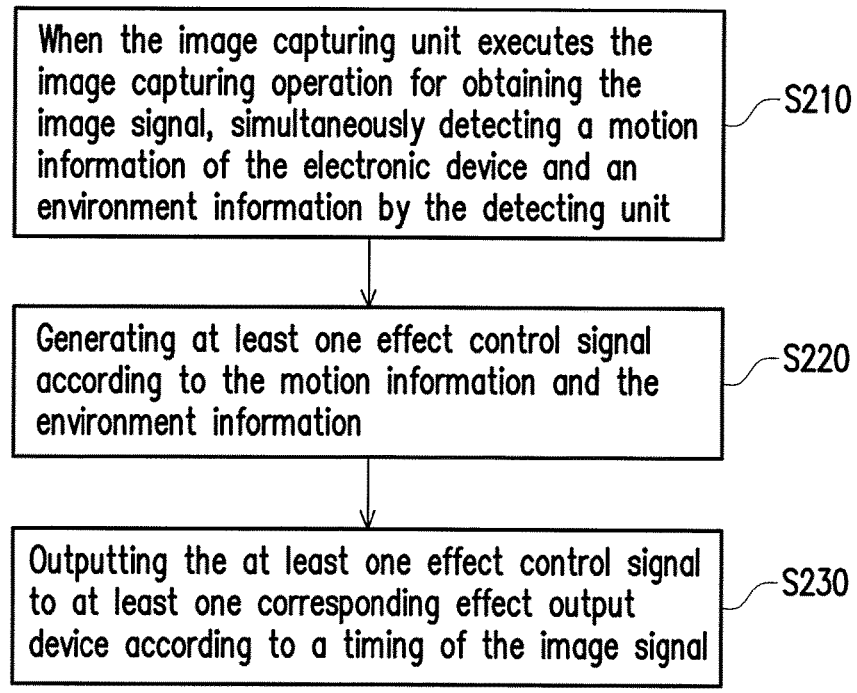
FIG. 2 is a flow chart illustrating a multimedia control method according to an embodiment of the invention.

FIG. 2 is a flow chart illustrating a multimedia control method according to an embodiment of the invention, which is adapted to the electronic device 100 in FIG. 1. Detailed steps of the proposed method will be illustrated along with the components of the electronic device 100 hereafter.

Referring to FIG. 1 and FIG. 2, in Step S210, when the image capturing unit 110 executes the image capturing operation for obtaining the image signal, the detecting unit 120 simultaneously detects a motion information of the electronic device 100 and an environment information. Specifically, in an embodiment, the image capturing unit 110 and the detecting unit 120 may be turned on at the same time, and therefore the detecting unit 120 may be used for detecting and recording the motion of the electronic device 100 and the environmental status during the image capturing operation executed by the image capturing unit 110.

In Step S220, the processing unit 130 generates at least one effect control signal according to the motion information and the environment information. In Step S230, the processing unit 130 outputs the at least one effect control signal to at least one corresponding effect output device according to a timing of the image signal. Particularly, the timing of the image signal may be record together when the image signal is obtained. For convenient description, merely an effect output device 500 is illustrated in FIG. 1. However, the invention is not intended to limit the number of the effect output device.

In detail, the timing of the image signal may be used for synchronously outputting the at least one effect control signal with the image signal by the processing unit 130. The processing unit 130 may use the image signal for controlling a stereoscopic projection system to play a 3D video (i.e. to provide stereoscopic effect for the audience). Further, the processing unit 130 may use the at least one effect control signal for controlling the at least one corresponding effect output device 500 to output the physical effects (e.g. the physical motion and sensory experiences) synchronously with the stereoscopic effect. Therefore, a four-dimensional (4D) film or a five-dimensional (5D) film (i.e. the 3D video with additional physical effects) may be presented, where the original environmental status may be effectively simulated.

Form another perspective, a multimedia data including the image signal and the effect control signal may be a 4D multimedia data or a 5D multimedia data.

It is worth mentioning that, in an exemplary embodiment, the at least one corresponding effect output device 500 may include a seat motion effects system and an environment effects system. The effect control signal may be used to control at least one seat motion effects device in the seat motion effects system to provide seat motion effects. In addition, the effect control signal may also used to control at least one environment effects device in the environment effects system to provide environment effects. Thus, the original environmental status may be effectively simulated by the seat motion effects and the environment effects based on the effect control signal.

More specifically, the effect control signal may include a plurality of feeling information, such as a wind speed feeling information, a wind direction feeling information, a moving direction feeling information, a vibration feeling information, an ambient light feeling information and a temperature and humidity feeling information. The processing unit 130 may use the at least one effect control signal to control the corresponding effect output devices with different functions, such as motion chairs, air-conditioners, sprinklers, fans and adjustable color lights (e.g. organic light-emitting diodes (OLEDs)), etc. For instance, seat motion effects may be provided by the motion chairs controlled depending on the moving direction feeling information and the vibration feeling information, and environmental effects may be provided by the fans controlled depending on the wind speed feeling information and the wind direction feeling information. As such, scenes and the environmental status corresponding to the 3D video may be simulated.

It is worth mentioning that, in the present embodiment, the processing unit 130 may calculate the effect control signal depending on types of the feeling information, so as to simulate scenes and the environment precisely. For instance, in an embodiment, the processing unit 130 may calculate an intensity of the effect control signal, specifically the motion effects, according to a weight ratio among part or all of the detected motion information and the detected environment information. Besides, in some embodiments, the processing unit 130 may adjust the intensity of the effect control signal since different environment information may influence each other under certain conditions. Alternatively, the processing unit 130 may directly convert the detected data into the intensity of the effect control signal. Detailed descriptions of the aforementioned embodiments will be illustrated hereafter.

First, the embodiments of calculating the intensity of the effect control signal according to the weight ratio among part or all of the detected motion information and the detected environment information may be explained as follows.

Figure 3:
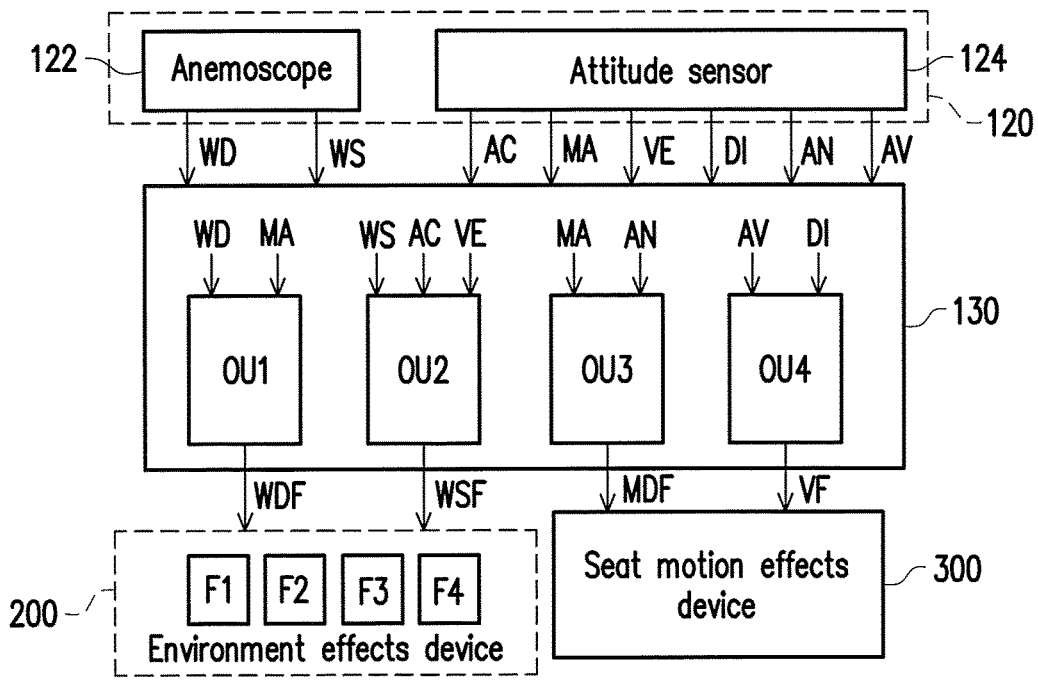
FIG. 3 is a block diagram illustrating a multimedia control system according to an embodiment of the invention.

FIG. 3 is a block diagram illustrating a multimedia control system according to an embodiment of the invention, where the multimedia control system includes the electronic device 100 and the effect output device 500 disclosed by embodiment in FIG. 1. In the present embodiment, the effect output device 500 may include an environment effects device 200 and a seat motion effects device 300. It should be noted that, for convenience, only the detecting unit 120 and the processing unit 130 of the electronic device 100 are illustrated in FIG. 3. Besides, the number of effect output devices including the environment effects device 200 and the seat motion effects device 300 may be changed adaptively.

Referring to FIG. 3, the detecting unit 120 may include an anemoscope 122 and an attitude sensor 124. The anemoscope 122 may be used to detect the wind direction data WD and the wind speed data WS included in the environment information. The attitude sensor 124 may include a gyroscope, an accelerometer and a magnetometer (not shown in FIG. 3), and therefore may be used to detect the acceleration data AC, the angular velocity data AV and the magnetic data MA included in the motion information. In addition, the attitude sensor 124 may further detect the velocity data VE, the angle data AN and the displacement data DI, where the velocity data VE may be derived from the integral of the acceleration data with respect to time, the angle data AN may be derived from the integral of the angular velocity data with respect to time, and the displacement data DI may be derived from the integral of the velocity data with respect to time. In some embodiments, the velocity data VE, the angle data AN and the displacement data DI may be calculated by the processing unit 130.

Based on the aforementioned detected data, in the present embodiment, the processing unit 130 may calculate the intensity of the effect control signal according to a weight ratio among part or all of the acceleration data, the velocity data, the displacement data, the angle data, the angular velocity data, the magnetic data, the wind speed data and the wind direction data.

In the embodiment disclosed by FIG. 3, the effect control signal may include a plurality of feeling information, such as a wind speed feeling information WSF, a wind direction feeling information WDF, a moving direction feeling information MDF and a vibration feeling information VF. The processing unit 130 may execute operation units OU1, OU2, OU3 and OU4 to calculate the aforementioned feeling information WSF, WDF, MDF and VF respectively. The operation units OU1, OU2, OU3 and OU4 may be, for example, physical logic circuits, which are controlled by the processing unit 130. Alternatively, the processing unit 130 may access and execute software codes stored in the storage unit 140 to implement functions of the operation units OU1, OU2, OU3 and OU4. In other words, the invention is not intended to limit the implementation of the operation units OU1, OU2, OU3 and OU4.

In detail, the processing unit 130 may execute the operation unit OU1 to calculate an intensity of the wind direction feeling information WDF according to the magnetic data MA, the wind direction data WD and the weight ratio between the magnetic data MA and the wind direction data WD. For example, the processing unit 130 may execute the operation unit OU1 to add the magnetic data MA and the wind direction data WD at a weight ratio of 0.5:0.5, and may set the calculated result of the operation unit OU1 as the intensity of the wind direction feeling information WDF.

In addition, the processing unit 130 may execute the operation unit OU2 to calculate an intensity of the wind speed feeling information WSF according to the velocity data VE, the acceleration data AC, the wind speed data WS and the weight ratio among the velocity data VE, the acceleration data AC and the wind speed data WS. For example, the processing unit 130 may execute the operation unit OU2 to add the velocity data VE, the acceleration data AC and the wind speed data WS at a weight ratio of 0.4:0.3:0.3, and may set the calculated result of the operation unit OU2 as the intensity of the wind speed feeling information WSF.

Moreover, the processing unit 130 may execute the operation unit OU3 to calculate an intensity of the moving direction feeling information MDF according to the magnetic data MA, the angle data AN and the weight ratio between the magnetic data MA and the angle data AN. For example, the processing unit 130 may execute the operation unit OU3 to add the magnetic data MA and the angle data AN at a weight ratio of 0.5:0.5, and may set the calculated result of the operation unit OU3 as the intensity of the moving direction feeling information MDF.

Besides, the processing unit 130 may execute the operation unit OU4 to calculate an intensity of the vibration feeling information VF according to the angular velocity data AV, the displacement data DI and the weight ratio between the angular velocity data AV and the displacement data DI. For example, the processing unit 130 may execute the operation unit OU4 to add the angular velocity data AV and the displacement data DI at a weight ratio of 0.5:0.5, and may set the calculated result of the operation unit OU4 as the intensity of the vibration feeling information VF.

Further, in an embodiment, the environment information may also include an atmospheric pressure data. The processing unit 130 may adjust the intensity of the vibration feeling information VF according to the atmospheric pressure data, based on the relationship between atmospheric pressure data and altitude or height.

It should be noted that the aforementioned weight ratios are merely examples for illustrating conveniently. Different proportions of the weight ratios may be adaptively adjusted based on detecting capabilities of the detecting element or sensors in the detecting unit 120, and the invention is not intended to limit thereto.

In the exemplary embodiment in FIG. 3, the processing unit 130 may use the wind direction feeling information WDF and the wind speed feeling information WSF to control fans F1, F2, F3 and F4 of the environment effects device 200 to provide wind effect, where the fans F1, F2, F3 and F4 may be respectively located at the east, west, south and north side in the cinema space. In addition, the processing unit 130 may also use the moving direction feeling information MDF and the vibration feeling information VF to control the seat motion effects device 300 to provide vibration effect, such that the seat motion effects device 300 may vibrate or move in a front and rear direction, in an up and down direction, or in a left and right direction, or may rotate in a clockwise direction or in a counterclockwise direction.

Moreover, it is worth mentioning that, the embodiment may utilize four levels to control the fans F1, F2, F3 and F4 to output different intensity of the wind speed. For example, the level 1 may correspond to the wind speed from 0 to 1.5 m/s (meters per second), the level 2 may correspond to the wind speed from 1.6 m/s to 3.3 m/s, the level 3 may correspond to the wind speed from 3.4 m/s to 5.4 m/s, and the level 4 may correspond to the wind speed more than 5.4 m/s. In particular, the level 1 to the level 4 of the output wind speed may also reflect strengths of a wind pressure substantially.

Next, the following embodiment illustrates the case that different environment information may influence each other under certain conditions.

Take feelings of the temperature and the humidity for example, generally, human beings may feel colder when the humidity is higher in a cold environment, while may feel hotter when the humidity is higher in a hot environment. Considering the aforementioned situations, for the environment information including the temperature data and the humidity data, the processing unit 130 may determine whether the humidity data is greater than a humidity threshold, and when the humidity data is greater than the humidity threshold, the processing unit 130 may adjust the intensity of the temperature feeling information according to determining whether the temperature data is greater than a temperature threshold.

Figure 4:
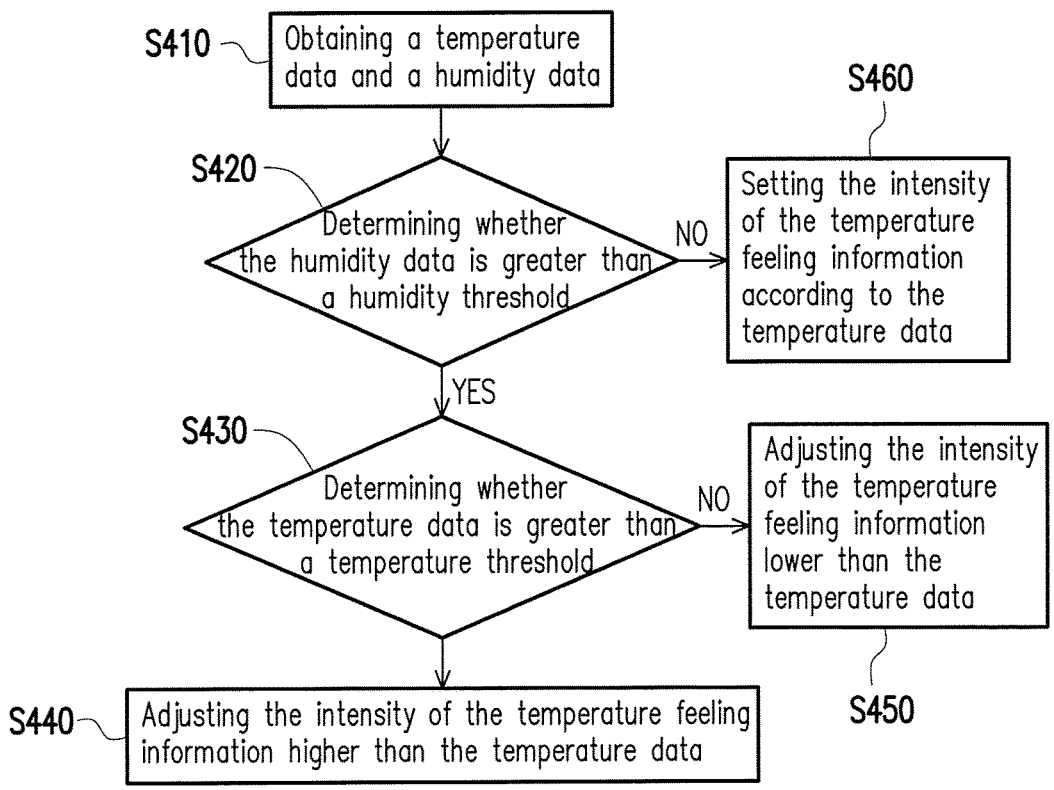
FIG. 4 is a flow chart illustrating a multimedia control method according to another embodiment of the invention.

More specifically, FIG. 4 is a flow chart illustrating a multimedia control method according to another embodiment of the invention, which illustrates detailed process of setting an intensity of the temperature feeling information of the effect control signal. Referring to FIG. 4, in Step S410, the processing unit 130 obtains a temperature data and a humidity data. In the present embodiment, the detecting unit 120 may detect the temperature data by the temperature sensor, and detect the humidity data by the humidity sensor, and then the detecting unit 120 may transmit the temperature data and the humidity data to the storage unit 140 for the processing unit 140 to access. In Step S420, the processing unit 130 determines whether the humidity data is greater than a humidity threshold. When the humidity data is greater than the humidity threshold, in Step S430, the processing unit 130 determines whether the temperature data is greater than a temperature threshold. When the temperature data is greater than the temperature threshold, in Step S440, the processing unit 130 adjusts the intensity of the temperature feeling information higher than the temperature data. Conversely, when the temperature data is not greater than the temperature threshold, in Step S450, the processing unit 130 adjusts the intensity of the temperature feeling information lower than the temperature data. On the other hand, when the humidity data is determined not greater than the humidity threshold in Step S420, the processing unit 130 enters Step S460, and sets the intensity of the temperature feeling information according to the temperature data.

Take the temperature threshold is 25 degrees Celsius and the humidity threshold is 75% for example, when the temperature data is not greater than 25 degrees Celsius and the humidity data is greater than 75%, the processing unit 130 may adjust the intensity of the temperature feeling information to be 16 degrees Celsius, such that an air-conditioner (not shown) of the environment effects device 200 may provide a lower temperature than the temperature data based on the adjusted temperature feeling information. When the temperature data is greater than 25 degrees Celsius and the humidity data is greater than 75%, the processing unit 140 may adjust the intensity of the temperature feeling information to be 35 degrees Celsius, such that the air-conditioner of the environment effects device 200 may provide a higher temperature than the temperature data based on the adjusted temperature feeling information.

As for the humidity data is not greater than 75%, the processing unit 130 may ignore the impact of the humidity data and may set the temperature feeling information to be equal to the temperature data.

Alternatively, in other embodiments, the processing unit 130 may directly convert the detected data into the intensity of the effect control signal. For the environment information including the lightness data and the color data, the processing unit 130 may set the intensity of the ambient light feeling information according to the lightness data and the color data. For example, when the detected lightness data is 1500 lux and the color data is red (e.g. in a volcanic situation), the processing unit 130 may set the intensity of the ambient light feeling information to control adjustable color lights (e.g. organic light-emitting diodes (OLEDs)), of the environment effects device 200 to output light effects with the lightness of 1500 lux and red color.

Based on the above, the embodiments of the invention may be adapted to produce a 5D film, such that a 3D video and its corresponding motion effects and sensory experiences may be record and edited at the same time. Take recording the riding of a roller coaster for example, the electronic device 100 may be set at the front of the roller coaster. As the image capturing unit 110 starts to execute the image capturing operation for recording the 3D video (i.e. obtaining a series of image signals), the detecting unit 120 may simultaneously detect the motion information and the environment information for recording the original environmental status during the image capturing operation executed by the image capturing unit 110. Then, by calculating part or all of the motion information and the environment information, the original environmental status may be converted into the effect control signal, so as to control the environment effects device 200 and the seat motion effects device 300 to provide motion effects and the sensory experiences synchronously with the timing of the 3D video, and thereby the original environmental status may be reproduced and provided for the audience.

For example, the detecting unit 120 may detect an acceleration data of 2 g (where the "g" indicates a gravitational field strength), a velocity data of 120 kilometers per hour, a displacement data of 50 meters, an angular velocity data of 85 degrees per 1.5 seconds, an angle data of 85 degree angle north, and a magnetic data of the direction from south to north. The processing unit 130 may determine that the roller coaster may at a 12-meter-height position and move from south to north at a speed of 120 kilometers per hour and generate the effect control signal according to the aforementioned detected data. The effect control signal may be used for controlling the seat motion effects device 300 to tilt forward 85 degrees in 1.5 seconds and continue tilting for 1.5 seconds, and for controlling the fan F4, which is located at the north side in the cinema space, of the environment effects device 200 to output the wind speed with the level 4. Hence, based on the timing of the image signal, the effect control signal and the image signal may be synchronously output, such that immersive experiences of riding the roller coaster may be reproduced.

To conclude the above, the embodiments disclosed by the invention may obtain the image signal and simultaneously detect the motion information of the electronic device and the environment information, so as to generate the effect control signal precisely based on the detected motion information of the electronic device and the environment information. Particularly, considering the weight ratio among part or all of the detected motion information and the detected environment information, or considering the interaction between different environment information, the original environmental status may be precisely converted into the effect control signal. Thereby, immersive experiences may be reproduced. Besides, the required time and the human resource because of the post-production may also be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multimedia control method, adapted to an electronic device having an image capturing unit and a detecting unit, comprising:
   when executing an image capturing operation for obtaining an image signal by the image capturing unit, simultaneously detecting a motion information of the electronic device and an environment information by the detecting unit;
   generating at least one effect control signal according to the motion information and the environment information; and
   outputting the at least one effect control signal to at least one corresponding effect output device according to a timing of the image signal, so as to control the at least one corresponding effect output device to reproduce an environment having an original environmental status corresponding to the motion information and the environment information according to the at least one effect control signal.

2. The multimedia control method according to claim 1, wherein the motion information comprises an acceleration data, a velocity data, a displacement data, an angle data, an angular velocity data and a magnetic data, the environment information comprises a wind speed data and a wind direction data, and the step of generating the effect control signal according to the motion information and the environment information comprising:
   calculating an intensity of the effect control signal according to a weight ratio among part or all of the acceleration data, the velocity data, the displacement data, the angle data, the angular velocity data, the magnetic data, the wind speed data and the wind direction data.

3. The multimedia control method according to claim 2, wherein the effect control signal comprises a wind direction feeling information, and the step of generating the effect control signal comprising:
   calculating an intensity of the wind direction feeling information according to the wind direction data, the magnetic data and the weight ratio between the wind direction data and the magnetic data.

4. The multimedia control method according to claim 2, wherein the effect control signal comprises a wind speed feeling information, and the step of generating the effect control signal comprising:
   calculating an intensity of the wind speed feeling information according to the velocity data, the acceleration data, the wind speed data and the weight ratio among the velocity data, the acceleration data and the wind speed data.

5. The multimedia control method according to claim 2, wherein the effect control signal comprises a moving direction feeling information, and the step of generating the effect control signal comprising:
   calculating an intensity of the moving direction feeling information according to the magnetic data, the angle data and the weight ratio between the magnetic data and the angle data.

6. The multimedia control method according to claim 2, wherein the effect control signal comprises a vibration feeling information, and the step of generating the effect control signal comprising:
   calculating an intensity of the vibration feeling information according to the angular velocity data, the displacement data and the weight ratio between the angular velocity data and the displacement data.

7. The multimedia control method according to claim 6, wherein the environment information further comprises an atmospheric pressure data, and the step of calculating the intensity of the vibration feeling information comprising:
   adjusting the intensity of the vibration feeling information according to the atmospheric pressure data.

8. The multimedia control method according to claim 1, wherein the environment information comprises a lightness data and a color data, the effect control signal comprises an ambient light feeling information, and the step of generating the effect control signal according to the motion information and the environment information comprising:
   setting an intensity of the ambient light feeling information according to the lightness data and the color data.

9. The multimedia control method according to claim 1, wherein the environment information comprises a temperature data and a humidity data, the effect control signal comprises a temperature feeling information, and the step of generating the effect control signal according to the motion information and the environment information comprising:
   determining whether the humidity data is greater than a humidity threshold;
   when the humidity data is greater than the humidity threshold, adjusting an intensity of the temperature feeling information according to determining whether the temperature data is greater than a temperature threshold; and
   when the humidity data is not greater than the humidity threshold, setting the intensity of the temperature feeling information according to the temperature data.

10. The multimedia control method according to claim 1, wherein a multimedia data including the image signal and the effect control signal is a four dimensional multimedia data or a five dimensional multimedia data.

11. An electronic device, comprising:
    an image capturing unit, executing an image capturing operation for obtaining an image signal;
    a detecting unit, detecting a motion information of the electronic device and an environment information; and
    a processing unit, coupled to the image capturing unit and the detecting unit, wherein when executing the image capturing operation for obtaining the image signal by the image capturing unit, the processing unit simultaneously detects a motion information of the electronic device and an environment information by the detecting unit, generates at least one effect control signal according to the motion information and the environment information, and outputs the at least one effect control signal to at least one corresponding effect output device according to a timing of the image signal, so as to control the at least one corresponding effect output device to reproduce an environment having an original environmental status corresponding to the motion information and the environment information according to the at least one effect control signal.

12. The electronic device according to claim 11, wherein the motion information comprises an acceleration data, a velocity data, a displacement data, an angle data, an angular velocity data and a magnetic data, the environment information comprises a wind speed data and a wind direction data, and the processing unit calculates an intensity of the effect control signal according to a weight ratio among part or all of the acceleration data, the velocity data, the displacement data, the angle data, the angular velocity data, the magnetic data, the wind speed data and the wind direction data.

13. The electronic device according to claim 12, wherein the effect control signal comprises a wind direction feeling information, and the processing unit calculates an intensity of the wind direction feeling information according to the wind direction data, the magnetic data and the weight ratio between the wind direction data and the magnetic data.

14. The electronic device according to claim 12, wherein the effect control signal comprises a wind speed feeling information, and the processing unit calculates an intensity of the wind speed feeling information according to the velocity data, the acceleration data, the wind speed data and the weight ratio among the velocity data, the acceleration data and the wind speed data.

15. The electronic device according to claim 12, wherein the effect control signal comprises a moving direction feeling information, and the processing unit calculates an intensity of the moving direction feeling information according to the magnetic data, the angle data and the weight ratio between the magnetic data and the angle data.

16. The electronic device according to claim 12, wherein the effect control signal comprises a vibration feeling information, and the processing unit calculates an intensity of the vibration feeling information according to the angular velocity data, the displacement data and the weight ratio between the angular velocity data and the displacement data.

17. The electronic device according to claim 16, wherein the environment information further comprises an atmospheric pressure data, and the processing unit adjusts the intensity of the vibration feeling information according to the atmospheric pressure data.

18. The electronic device according to claim 11, wherein the environment information comprises a lightness data and a color data, the effect control signal comprises an ambient light feeling information, and the processing unit sets an intensity of the ambient light feeling information according to the lightness data and the color data.

19. The electronic device according to claim 11, wherein the environment information comprises a temperature data and a humidity data, the effect control signal comprises a temperature feeling information, and the processing unit determines whether the humidity data is greater than a humidity threshold, when the humidity data is greater than the humidity threshold, the processing unit adjusts an intensity of the temperature feeling information according to determining whether the temperature data is greater than a temperature threshold, and when the humidity data is not greater than the humidity threshold, the processing unit sets the intensity of the temperature feeling information according to the temperature data.

20. The electronic device according to claim 11, wherein a multimedia data including the image signal and the effect control signal is a four dimensional multimedia data or a five dimensional multimedia data.

* * * * *